Jan. 8, 1946.  R. H. WILSON  2,392,563
CHAIN SAW SETTING, JOINTING, AND FILING DEVICE
Filed May 13, 1944  2 Sheets-Sheet 1
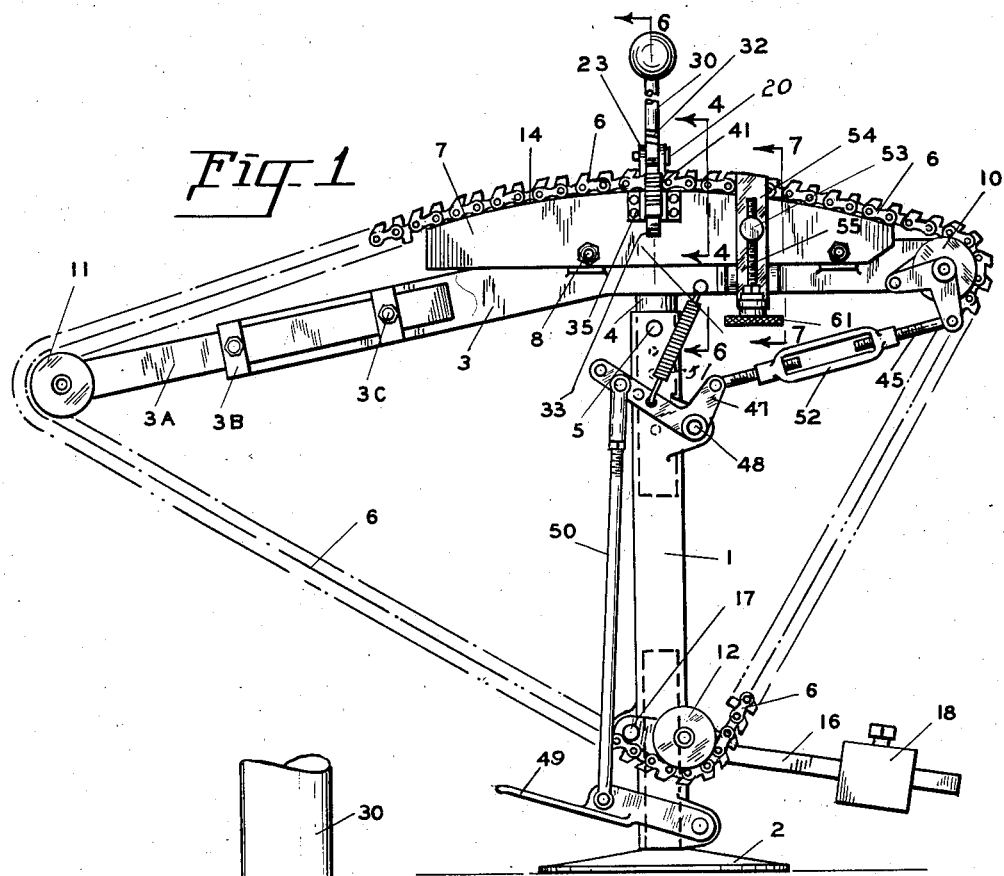
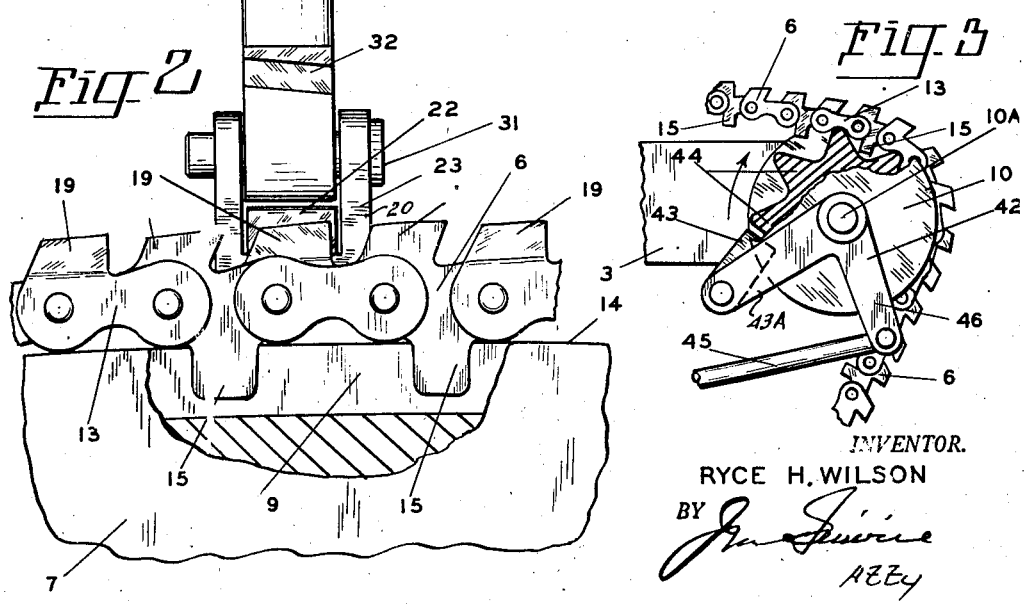
INVENTOR.
RYCE H. WILSON

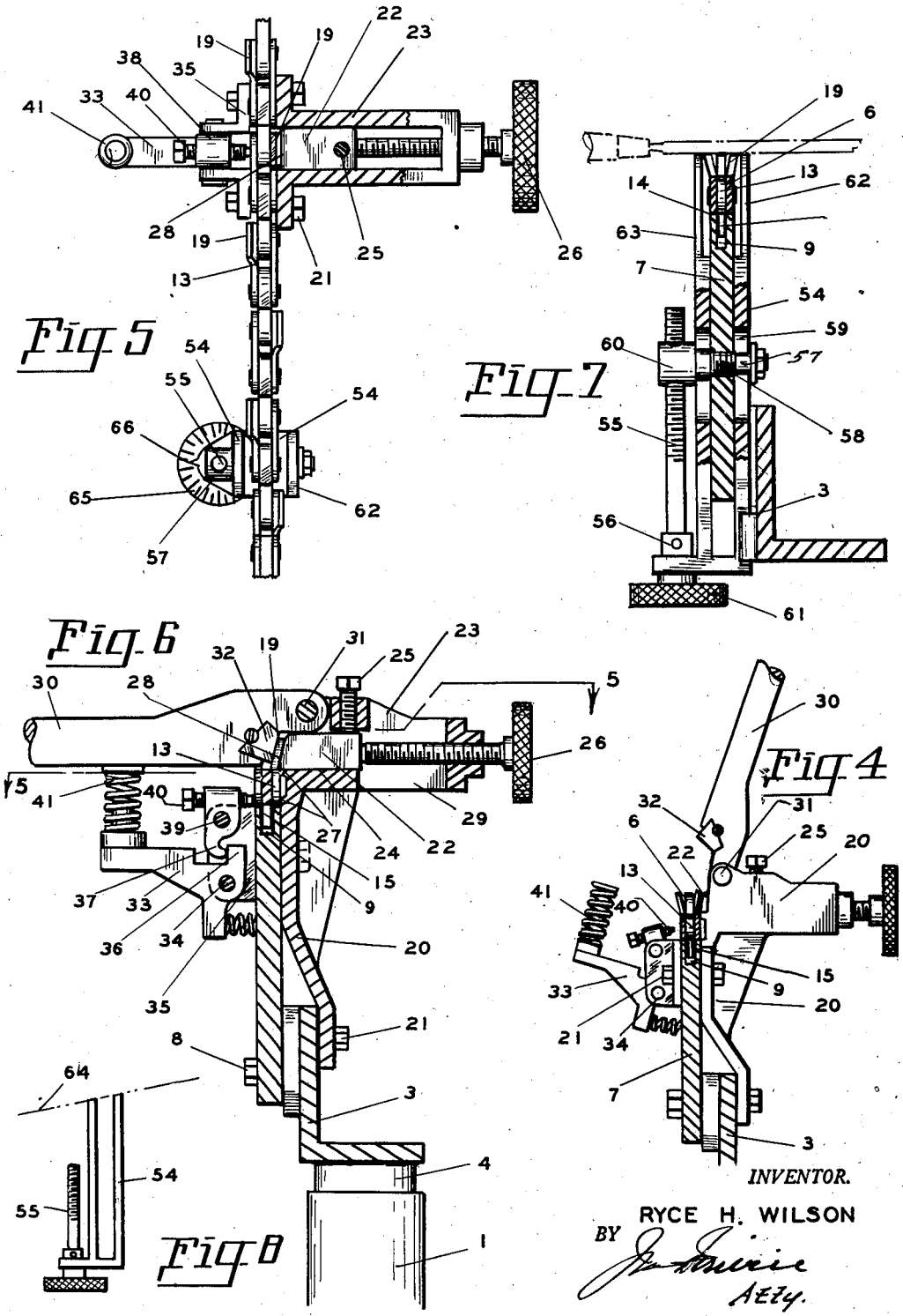

Patented Jan. 8, 1946

2,392,563

UNITED STATES PATENT OFFICE 2,392,563

CHAIN SAW SETTING, JOINTING, AND FILING DEVICE

Ryce H. Wilson, Roseburg, Oreg.

Application May 13, 1944, Serial No. 535,464

7 Claims. (Cl. 76—63)

This invention relates to saw jointing, setting and filing devices and is particularly adapted to be used for conditioning chain saws.

The primary object of the invention is to provide a device for supporting a chain saw thereon for jointing, setting and filing the saw.

A further object of the invention is to mount a special jointer gauge upon the device for jointing the teeth of a chain saw.

A further object of the invention is to provide a special saw setting tool in connection with the device for setting the teeth of the saw.

A further object of the invention is to provide means for moving the chain saw through the machine by a mechanical ratchet device while the saw is being conditioned.

A further object of the invention is to provide a chain saw supporting unit that can be raised or lowered or rotated about its vertical axis while the operator is conditioning the saw.

These and other incidental objects will be apparent in the drawings, specifications and claims.

Referring to the drawings:

Figure 1 is a side elevation of my new and improved chain saw conditioning device, illustrating the general assembly.

Figure 2 is a fragmentary side view of the chain adjacent the setting tool, partially broken away for convenience of illustration.

Figure 3 is a fragmentary view of the sprocket for supporting the moving chain saw, partially broken away to show the chain mounting and driving ratchet.

Figure 4 is a cross sectional view of the saw holding frame, taken on line 4—4 of Figure 1, looking in the direction indicated and especially illustrating the saw setting device.

Figure 5 is a fragmentary plan view of the saw setting device, partially broken away for convenience of illustration, together with a plan view of the jointing device taken on line 5—5 of Figure 1.

Figure 6 is a sectional view, taken on line 6—6 of Figure 1, illustrating the saw set being in position for setting one of the teeth of the saw.

Figure 7 is a sectional view, taken on line 7—7 of Figure 1, illustrating the jointing gauge.

Figure 8 illustrates the jointing gauge removed from the frame of the device, the gauge having the gauging surface at an angle different than that illustrated in Figure 7.

In the drawings:

My new and improved chain saw holding device consists of a vertical pedestal 1, revolvably mounted upon a base 2. Upon the upper end of the pedestal is mounted a T-frame 3, having a downwardly extending post 4 for entering the upper end of the pedestal 1, being held in any desired elevated position by the locking bolt 5.

A secondary frame 7 is secured to the frame 3 by the bolts 8 and have a groove 9 along its upper surface for supporting the chain saw 6 thereon. The chain 6 is trained about a driving sprocket 10, idler pulleys 11 and 12, the chain having its outer links 13 running over the surface 14 of the frame 7 and its inner guides 15 running within the slot 9 of the frame 7, holding the chain in line upon the frame, similar to its mounting upon the saw frame not here shown. Various lengths of chain saws may be mounted to the device. This is accomplished by the extension frame 3A working through the guides 3B of the main frame 3. This extension frame may be locked in any position by the cap screw 3C.

The idler 12 provides a fine adjustment and tension to the chain while being conditioned. The pulley 12 is mounted to the lever arm 16, which is mounted to the pedestal 1 at 17. A weight 18 is mounted to the bar 16 for providing the desired amount of tension to the chain 6.

I will now first describe the operation of setting the cutter teeth 19 of the chain 6. Secured to the frame 7, best illustrated in Figures 4, 5 and 6, is a tooth setting device 20. This device may be secured to the frame by any suitable means, as bolts 21. A movable die 22 is slidably mounted within the frame 23, resting on the surface 24 on its lower side and being locked in fixed position by the set screw 25 on its upper side. Lateral adjustment may be applied to the die 22 by the hand wheel and screw 26.

The surface 28 of the die 22 is formed to a desired angle to set the tooth, and this angle may vary for different saw settings required for cutting various types of timber, therefore, I have provided an easy way of interchanging the die 22 by making it possible to remove the same by backing off the hand set screw 26 and removing the die out through the opening 29. A lever 30 is pivotally mounted to the frame 20 at 31 and carries a shaping die 32 therein. This die is made to correspond to the die 22 and is removable.

In the operation of setting the saw teeth, the lever 30 is brought down to the position shown in Figure 6. It is first desirable to lock the chain relative to the die 22 before setting the tooth. This is accomplished through the operation of the lever 33, which is pivotally mounted at 34 to the bracket 35, which is in turn secured to the frame 7. The cam 36 of the lever 33 engages the cam 37 of the lever 38, which is also pivotally mounted within the frame 35 at 39.

A set screw 40 is adjustably positioned within the lever 38 and contacts the chain 6, forcing the same against the points 27 of the frame 23 when the arm 33 is forced down by the action of the lever arm 30, contacting the spring 41 slightly before the die 32 engages the tooth 19 of the saw, thereby holding the saw chain rigidly while the arm 30 is further lowered forcing the die 32 towards the saw tooth and the die 22, setting the tooth.

When the tooth has been set, as above described, the lever 30 is raised to the position illustrated in Figures 1 and 4, at which time the chain saw is moved forward to the next tooth to be set. This is accomplished in the following manner. A bell crank 42, pivotally mounted to the stub shaft 10A, carries a ratchet pawl 43 on its arm 43A, best illustrated in Figure 3. The pawl 43 engages the teeth 44 of the driving sprocket 10 and will rotate the same when the bell crank 42 is rotated by the connecting link 45, which is pivotally mounted to the arm 46 of the bell crank 42 at its one end and to the bell crank 47 at its opposite end. The bell crank 47 is pivotally mounted to the pedestal 1 at 48, and is operated by a foot pedal 49 through a connecting link 50.

A spring 51 holds the bell crank 47 in the position shown in Figure 1, one of its ends being connected to the bell crank and the opposite end to the T-frame 3. When the pedal 49 is depressed the link 50 rocks the bell crank 47 about its pivot point 48, pulling the link 45 with the same and rocking the bell crank 42 so as to move the sprocket 44 in the direction of the arrow, bringing the teeth of the chain in alignment with the die 22 of the setting device. A fine and accurate adjustment of the distance that the chain is moved may be governed by the turn buckle arrangement 52 which will determine the distance that the bell crank 42 will be rotated after the pawl 43 engages the teeth 44 of the drive sprocket 10.

I will now describe the operation of the jointing device 53. Referring to Figures 5, 7 and 8, a U-shaped gauge 54 straddles the frame 7 and is held thereon by the adjusting screw 55, which is held in fixed position relative to the gauge 54 by the collar 56. Fixedly secured to the frame 7 is a spindle 57, this spindle is threaded into the frame 7 at 58, passing through the slots 59 of the gauge 54, providing a guide for the gauge while being adjusted up or down, as will now be described.

The enlarged end 60 of the spindle 57 receives the adjusting screw 55 and as the hand wheel 61 is revolved the gauge guide bars 62 and 63 will be raised up or down to the desired height for jointing the teeth of the saw, best shown in Figure 7. The upper ends of the gauge bars 62 and 63 may be shaped to different angles as illustrated by the line 64 in Figure 8, to accommodate the different angles of teeth while jointing the saw. The gauge unit being interchangeable for the various angles to be used. Suitable calibrations 65 may be associated with the hand wheel 61 and the point 66 for positioning the gauge relative to the teeth of the saw.

In the operation of my new and improved tooth jointing attachment the hand wheel 61 is rotated to adjust the upper ends of the guide bars 62 and 63 to the desired position for jointing the teeth of the saw. In Figure 7 I illustrate by broken lines the file being drawn over the ends of the jointer and the saw teeth. When the tooth is filed to the proper height the upper ends of the guide bars 62 and 63 will limit the cut of the file on the tooth.

I do not wish to be limited to the exact mechanical construction as illustrated and described, as other modified forms of mechanical equivalents may be used in carrying out the objects of my invention, and still coming within the scope of my claims.

What is claimed is:

1. A chain saw jointing, setting and filing device including a saw supporting frame formed for guiding the saw, means for feeding the saw in step by step movement in said frame, a saw setting means for setting the teeth of the saw including an anvil and a manually operable hand lever, a holding lever pivotally mounted below the hand lever, an element carried by the holding lever to engage and fix the saw against movement in the frame, a trip lever mounted below the holding lever, and operative to set the holding lever to cause the element to engage the saw, and means for compelling the hand lever to operate the trip lever in the initial movement of the hand lever and prior to the final setting operation of that lever.

2. A construction as defined in claim 1, wherein the means for operating the trip lever in the movement of the hand lever includes a spring carried by the trip lever and underlying and engageable by and in the movement of the hand lever.

3. A construction as defined in claim 1, wherein the member carried by the holding lever and adapted to engage the saw includes a screw element adjustable in the holding lever to insure a saw holding movement of such element in the operation of the holding lever.

4. A chain saw jointing, setting and filing device comprising a pedestal, a saw supporting frame formed with a longitudinally extending groove supported by and adjustable with relation to the pedestal, a saw setting means including an anvil to receive a saw tooth in the setting operation, a guide channel in which the anvil is movable, means carried by the frame to adjust the anvil longitudinally in the channel, means carried by the frame to lock the anvil in fixed position in the channel and a hand lever supported in the frame and having an element to force the saw teeth toward and into contact with the anvil in the saw setting operation.

5. A construction as defined in claim 4 wherein the anvil receiving channel is fully open at the bottom for a length exceeding that of the anvil to permit the removal of the anvil at will.

6. A chain saw jointing, setting and filing device, including a saw supporting frame formed with a groove in which the saw is slidable for feeding the saw in said groove in a step by step operation, and a jointing device for cooperation with the frame, said jointing device comprising a U-shaped bar to slidably embrace the frame, a pin passing through both arms of the bar and through the plate, and a set screw threaded in the pin and operable from beneath the bar to adjust the bar transverse the frame.

7. A construction as defined in claim 6, wherein the upper ends of both arms of the bar terminate in a definite angular plane to provide for a proper filing operation.

RYCE H. WILSON.